United States Patent [19]

Redding et al.

[11] 4,410,476
[45] Oct. 18, 1983

[54] METHOD FOR MAKING RADIALLY COMPLIANT LINE ARRAY HOSE

[75] Inventors: John J. Redding, West Warwick, R.I.; Robert O. Hauptmann, Groton, Conn.

[73] Assignee: The United States of America as represented by the Secretary of the Navy, Washington, D.C.

[21] Appl. No.: 325,419

[22] Filed: Nov. 27, 1981

Related U.S. Application Data

[62] Division of Ser. No. 198,743, Oct. 20, 1980.

[51] Int. Cl.³ .................... B29D 23/04; B29F 3/00
[52] U.S. Cl. .................................. 264/173; 138/174
[58] Field of Search ................ 264/173, 172, 174; 138/174

[56] References Cited

U.S. PATENT DOCUMENTS 3,416,982 12/1968 Petzetakas .......................... 264/173
3,441,637 4/1969 Davis ................................... 264/95
3,574,810 4/1971 Tourney et al. .................... 264/173
3,605,189 9/1971 Bauman et al. .................... 264/173
3,642,396 2/1972 Meneidis ............................ 264/173
3,825,036 7/1974 Stent .................................. 138/174

FOREIGN PATENT DOCUMENTS 1349843 4/1974 United Kingdom ................ 264/173

Primary Examiner—Willard E. Hoag
Attorney, Agent, or Firm—Robert F. Beers; Arthur A. McGill; Prithvi C. Lall

[57] ABSTRACT

A method for making a radially compliant acoustic line array hose with improved toughness and wear resistance, suitable for use in towed acoustical line array sonars. The hose comprises a long extruded cylindrical tubing of a soft flexible grade of geophysical, plasticized polyvinyl chloride material with longitudinal ribs of a stiffer, harder grade of geophysical plasticized polyvinyl chloride material located at or near the tubing surface, and spaced uniformly around the circumference of the tubing. The ribs are melt-bonded to the softer thermoplastic material while each is in their respective melt stages during the extrusion process.

3 Claims, 3 Drawing Figures

METHOD FOR MAKING RADIALLY COMPLIANT LINE ARRAY HOSE

STATEMENT OF GOVERNMENT INTEREST

The invention described herein may be manufactured and used by or for the Government of the United States of America for governmental purposes without the payment of any royalties thereon or therefor.

This is a division of application Ser. No. 198,743, filed Oct. 20, 1980.

BACKGROUND OF THE INVENTION

The present invention generally relates to towed acoustic line array hoses and more particularly to a radially compliant towed acoustic line array hose which provides improved wear resistance and toughness without sacrificing radial compliance and flexibility.

Prior acoustic line array hoses were fabricated of either an extruded thermoplastic material or a composite of one or more cured elastomeric compounds reinforced longitudinally, and often radially, with high strength fiber materials.

Extruded thermoplastic hose materials used are usually a flexible grade of Polyvinyl Chloride (PVC) or Thermoplastic Polyurethane (TPU). Flexibility is require so as to obtain sufficient radial compliance associated with low self-noise as well as satisfactory coiling and handling characteristics at environmental temperatures. Line array sonars with extruded outer tubing of PVC or TPU alone in this flexibility range are not tough enough however to obtain an adequate service life with desired reliability. The main damage mechanisms causing failure of the tubing envelope are abrasion, puncture by sharp objects and cut-through at the edges of banding clamps and spacers. Such failures generally occur in service, particularly during deployment, handling and storage, thereby presenting a major reliability problem.

Reinforced elastomeric hoses, depending on the strength and orientation of the reinforcing fibers, while somewhat more resistant to banding clamp and spacer cut-through, are subject to abrasion, nicks, cuts and sometimes punctures by sharp objects, have lower radial compliance and are limited as to the continuous length able to be produced by the presently used mandrel-wrapping and curing process.

SUMMARY OF THE INVENTION

Accordingly, it is a general purpose and object of the present invention to provide an improved toughness acoustic line array hose. It is a further object that the device be high in reliability. Another object is that the hose have high self-noise damping properties. An additional object is that the device be radially compliant to permit it to be easily coiled for storage and handling purposes. Further objects are that the hose exhibit improved abrasion, tear, cut and cut-through resistance. These and other objects of the invention and the various features and details of construction and operation will become apparent from the specification and drawings.

The above stated objects are accomplished with the present invention by providing a method for making a co-extruded acoustic line array hose which combines the properties of two or more thermoplastic materials in a manner where the desirable properties of each material are utilized to maximum advantage and the drawbacks or less desirable characteristics are diminished. A plurality of longitudinal runners of a tougher, stiffer thermoplastic are bonded to a softer, more flexible thermoplastic matrix. By varying the material properties, bonding methods and the size, shape, number, spacing and location of the tough runners, hose characteristics can be tailored for specific applications. Because a continuous extrusion process may be used, previous hose length limits associated with mandrel wrapped fiber reinforced hose are mitigated.

DESCRIPTION OF THE PREFERRED EMBODIMENT

Figure 1:
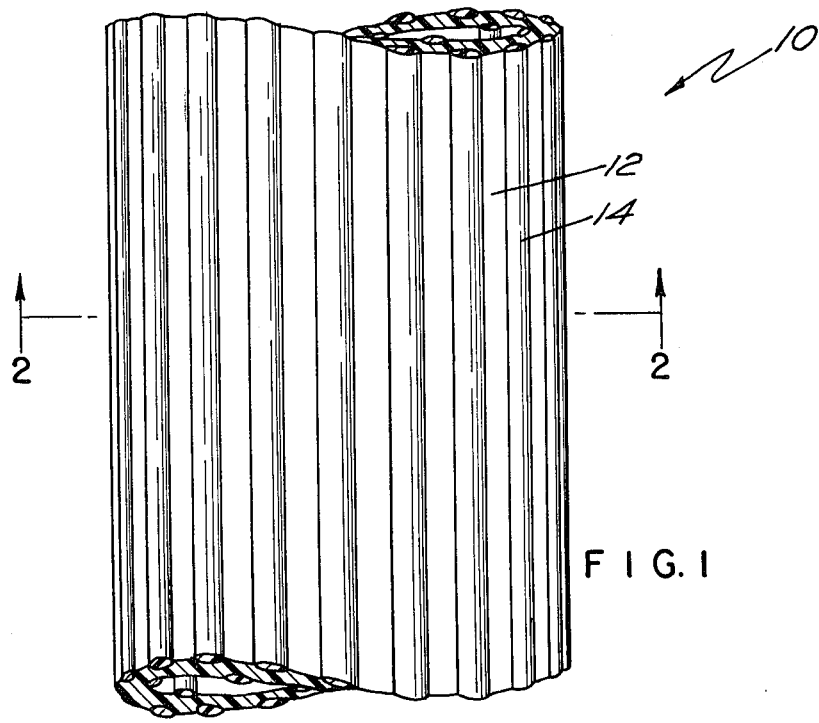
FIG. 1 shows an acoustic line array hose section built in accordance with the teachings of the present invention.
Figure 2:
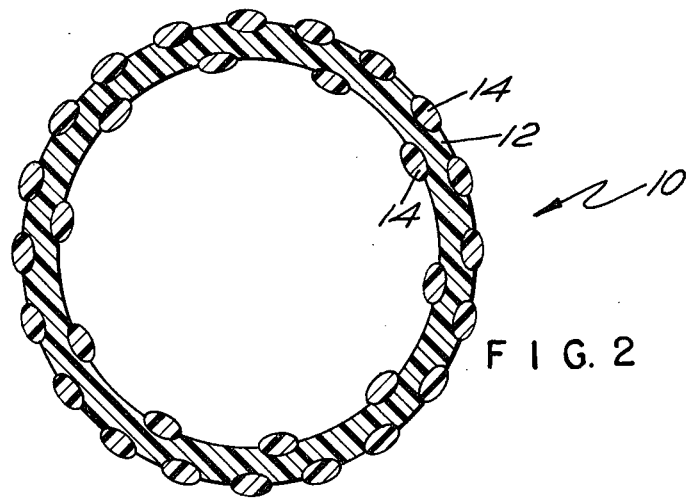
FIG. 2 is a sectional view taken along line 2—2 of FIG. 1.

Referring now to FIG. 1 there is shown an acoustic line array hose section 10 which comprises a long extruded cylindrical tubing 12 of a soft, flexible grade of geophysical plasticized polyvinyl chloride material with a plurality of longitudinal ribs 14 of a stiffer, harder geophysical plasticized polyvinyl chloride material. FIG. 2 shows said ribs 14 located at or near the tubing surface and spaced uniformly around the circumference of the tubing. The longitudinal ribs 14 melt-bond to the softer, flexible matrix material 12 during the extrusion process and are sized and spaced to function as a hard, abrasion-resistant surface which can withstand tearing, cutting and wearing when dragged over gravel or other sharp objects—particularly when the cutting edge moves perpendicular to the axis of the tubing. Said ribs 14 also resist cut-through at the edges of banding clamps and spacers thereby protecting the softer flexible material 12 between and below the stiffer ribs.

The flexibility and radial compliance of the tubing is provided by optimizing the compliance and self-noise damping characteristics of the softer thermoplastic material 12 between the ribs 14, thereby allowing a much larger choice of materials for the hard longitudinal ribs 14. Compliance in a polymer is the dynamic ratio of strain amplitude to stress amplitude and as used herein applies in the radial direction. Damping refers to vibration attenuation with low damping materials having a typical damping factor of 0.1 and which damping materials having a typical damping factor of 1.0. Self-noise for a towed array refers predominantly to the sound and vibration associated with hydrodynamic effects produced by towing.

Figure 3:
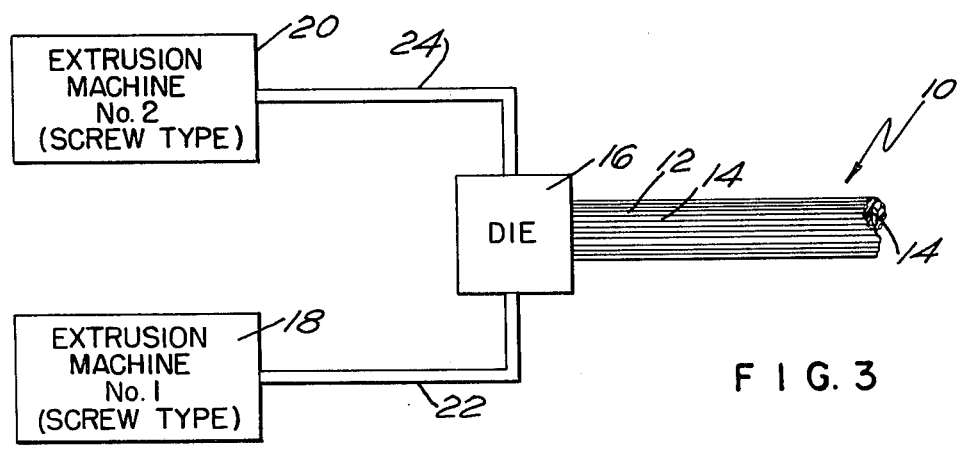
FIG. 3 is a block diagram representing the co-extrusion process according to the teachings of subject invention.

FIG. 3 shows the process whereby an acoustic line array hose 10 is co-extruded from a single extrusion die 16. The soft, flexible grade of geophysical, plasticized polyvinyl chloride material in the No. 1 screwtype extrusion machine 18 is heated to above its melt temperature and fed to die 16 through line 22 which connects extrusion machine 18 to die 16. Concurrently, the stiffer, harder grade of geophysical, plasticized polyvinyl chloride material in the No. 2 screwtype extrusion machine 20 is heated to above its melt temperature and fed to die 16 through line 24 which connects extrusion machine 20 to die 16. The two materials are then brought into contact within die 16 while still above their respective melt temperatures, melt bond on a molecular scale along the interface surfaces of the different hardness materials and subsequently harden by cooling to form continuous acoustic line array hose 10 having a plurality of raised longitudinal ribs of a stiffer, harder grade of PVC spaced uniformly around the periphery of a hose wall of a soft, flexible grade of PVC.

What has thus been described in a method for making a type of acoustic line array hose which combines the properties of two or more thermoplastic materials in a manner where the desirable properties of each material are utilized to maximum advantage and the less desirable characteristics are diminished. In one continuous tubing there are increased toughness, improved abrasion, tear and cut-through resistance while at the same time self-noise damping, radial compliance and flexibility characteristics are retained. Using a co-extrusion process, thermoplastic materials that would otherwise not be compatible, can be combined during their melt stage thus forming a tenacious bond. The size, number and spacing of the external longitudinal ribs can be varied to meet the severity of the operational environment commensurate with high damping, low self-noise and radial compliance. The flexible matrix material 12 of the hose can be selected from many compositions of geophysical plasticized polyvinyl chloride or thermoplastic polyurethane by choosing the one whose properties minimize array self-noise. The location of the ribs 14 on the outer surface can also be changed to a mixture of both outer and inner surfaces if internal components are thought to be a threat to hose wall integrity.

The invention is further illustrated by the following examples:

EXAMPLE 1

A radially compliant acoustic line array hose with eight longitudinal, hard ribs was co-extruded using the teachings contained in this disclosure. A flexible grade of geophysical plasticized polyvinyl with a hardness of 70–75 on the Shore 'A' scale was selected as the soft matrix material and a stiffer grade of the same material with a Shore 'A' hardness of 90–95 was chosen for the longitudinal ribs. These materials were co-extruded at a temperature above their melt point, i.e., from 300°–500° F., and allowed to harden into a final hose size and shape as follows:

| | |
|---|---|
| Outside Diameter (Flexible Matrix) | 1.1" (Nominal) |
| Wall Thickness (Flexible Matrix) | .1" |
| Number of Ribs | 8 |
| Rib Spacing | 45° apart |
| Rib Shape | Elliptical |
| Rib Size | .125" (Major Axis) .062" (Minor Axis) |
| Rib Location | On external hose circumference with major axis of the elipse tangent to the circumference and intersecting the circumference at the focal points of the elipse |

EXAMPLE 2

A radially compliant acoustic line array hose was co-extruded which was identical to the hose of Example 1 in all respects except that the soft matrix material used was a thermoplastic polyurethane with a Shore 'A' hardness of 70–75.

It will be understood that various changes in the details, materials, steps and arrangement of parts which have been herein described and illustrated in order to explain the nature of the invention, may be made by those skilled in the art within the principal and scope of the invention as expressed in the appended claims.

What is claimed is:

1. A process for manufacturing a line array hose which comprises the steps of:
    selecting a soft, flexible thermoplastic material having high damping characteristics for providing low self-noise and radial compliance as said hose is towed through the water;
    selecting a stiffer, harder thermoplastic material having high wear and cut-through resistance for providing protection to said soft, flexible material;
    heating said soft, flexible thermoplastic material above its melt temperature within a first screwtype extrusion machine;
    heating said stiffer, harder thermoplastic material above its melt temperature within a second screwtype extrusion machine;
    co-extruding said melted soft, flexible thermoplastic material and said melted stiffer, harder thermoplastic material concurrently through a single hose-forming die using well known methods such that said soft flexible thermoplastic material forms a long cylindrical tube and said stiffer, harder thermoplastic material forms a plurality of raised longitudinal ribs on the exterior surface of said cylindrical tube, said materials, being brought into intimate contact on a molecular scale while still in their respective melt stages thereby melt-bonding all along each surface in contact; and
    cooling the resulting hose extrusion to room temperature thereby causing the materials to return to their former plastic state and resulting in the formation of a tenacious bond between the two materials.

2. A process for manufacturing a line array hose according to claim 1 wherein the step of co-extruding further comprises extruding a first plurality of said raised longitudinal ribs with an elliptically shaped cross section, said ribs bring generally located on the exterior surface of said long cylindrical tube such that the major elipse axis of said ribs is tangent to the exterior tube surface and intersects the circumferential plane of said exterior tube surface at the focal points of said elipse, said ribs thereby being partially embedded in said hose so as to provide said wear and cut-through resistance while also providing a low drag profile during towing.

3. A process for manufacturing a line array hose according to claim 2 wherein the step of co-extruding further comprises extruding a second plurality of raised longitudinal ribs with an elliptically shaped cross section, melt-bonded to the interior circumferential surface of said long cylindrical tube for providing cut-through protection to said hose against internal array components.

* * * * *